US006446816B1

(12) United States Patent
Miller

(10) Patent No.: US 6,446,816 B1
(45) Date of Patent: *Sep. 10, 2002

(54) APPARATUS AND METHOD FOR PREVENTING THEFT OF A BICYCLE WHILE PROVIDING CONVENIENT STORING OF SAME

(76) Inventor: Jay R. Miller, 1140 S. Orlando Ave. #K14, Maitland, FL (US) 32751

( * ) Notice: Subject to any disclaimer, the term of this patent is extended or adjusted under 35 U.S.C. 154(b) by 73 days.

This patent is subject to a terminal disclaimer.

(21) Appl. No.: 09/677,252

(22) Filed: Oct. 2, 2000

(51) Int. Cl.[7] .......................... E05B 73/00; F16M 13/00
(52) U.S. Cl. ..................... 211/5; 248/551; 248/303
(58) Field of Search .................. 211/5; 248/551, 248/552, 303, 304, 302, 323, 331, 333, 495; D8/347, 370, 372, 373; 403/3, 292; 24/369, 370, 907; 411/389, 387, 383, 178

(56) References Cited

U.S. PATENT DOCUMENTS

| | | | |
|---|---|---|---|
| 606,118 A | 6/1898 | Bowman | 211/5 |
| D32,824 S | * 6/1900 | Schleicher | 137/170 |
| 1,202,444 A | 10/1916 | Soleau | 211/4 |
| 3,828,936 A | 8/1974 | Hoening | 211/19 |
| 3,970,197 A | 7/1976 | Bale, Jr. | 211/5 |
| 3,995,822 A | * 12/1976 | Einhorn et al. | 248/304 |
| 4,025,014 A | * 5/1977 | Larson | 248/552 |
| 4,126,228 A | 11/1978 | Bala et al. | 211/5 |
| 5,074,419 A | * 12/1991 | Smith | 211/17 |
| 5,292,009 A | 3/1994 | Smith | 21/20 |
| 5,553,715 A | 9/1996 | Brotz | 211/5 |
| 5,702,007 A | 12/1997 | Fritz et al. | 211/17 |
| 5,743,411 A | 4/1998 | Hawkes | 211/20 |
| 5,755,542 A | * 5/1998 | Janusz et al. | 248/58 |
| 5,765,801 A | * 6/1998 | Geiselman | 248/552 |
| 5,887,461 A | 3/1999 | Heffley | 70/18 |
| 6,036,153 A | * 3/2000 | Rose et al. | 248/302 |
| 6,311,851 B1 | * 11/2001 | Knudsen, Sr. et al. | 211/13.1 |

* cited by examiner

Primary Examiner—Blair M. Johnson
Assistant Examiner—Erica B. Harris
(74) Attorney, Agent, or Firm—Bracewell & Patterson, LLP

(57) ABSTRACT

An apparatus and method for securely storing a bicycle is provided. The apparatus has an elongate suspended mount having a distal end portion forming an open curved loop to receive a bicycle tire connected to a bicycle frame, a medial portion forming or connected to a closed loop to receive a locking device, and a proximal end portion connected to a fastener for suspending the mount from a ceiling or wall portion of a pre-existing structure. The closed loop preferably is positioned to be nearly or more than a quarter of, but substantially one half or less than, the length of the elongate suspended mount. The method aspects of the invention include suspending a bicycle from a pre-existing structure and securing the bicycle in position.

21 Claims, 7 Drawing Sheets

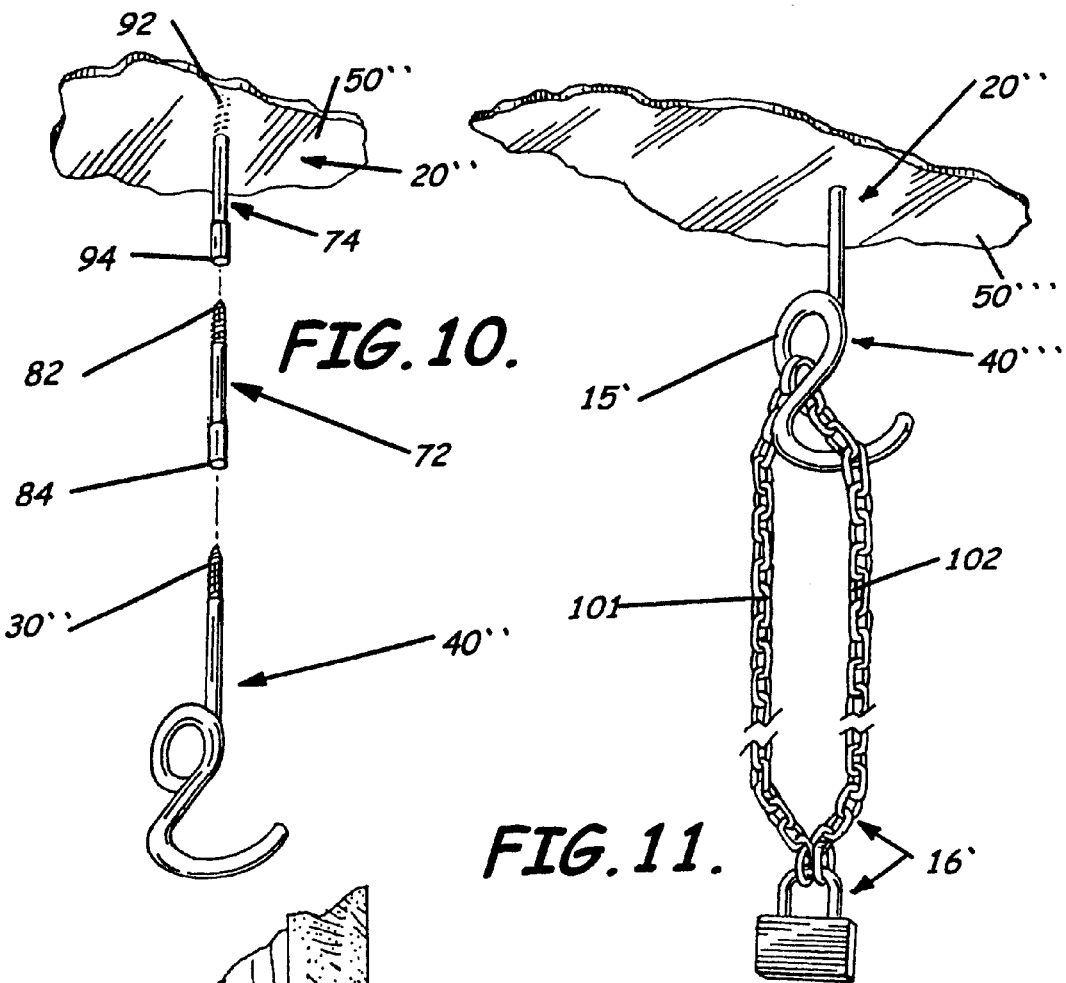
FIG. 10.
FIG. 11.
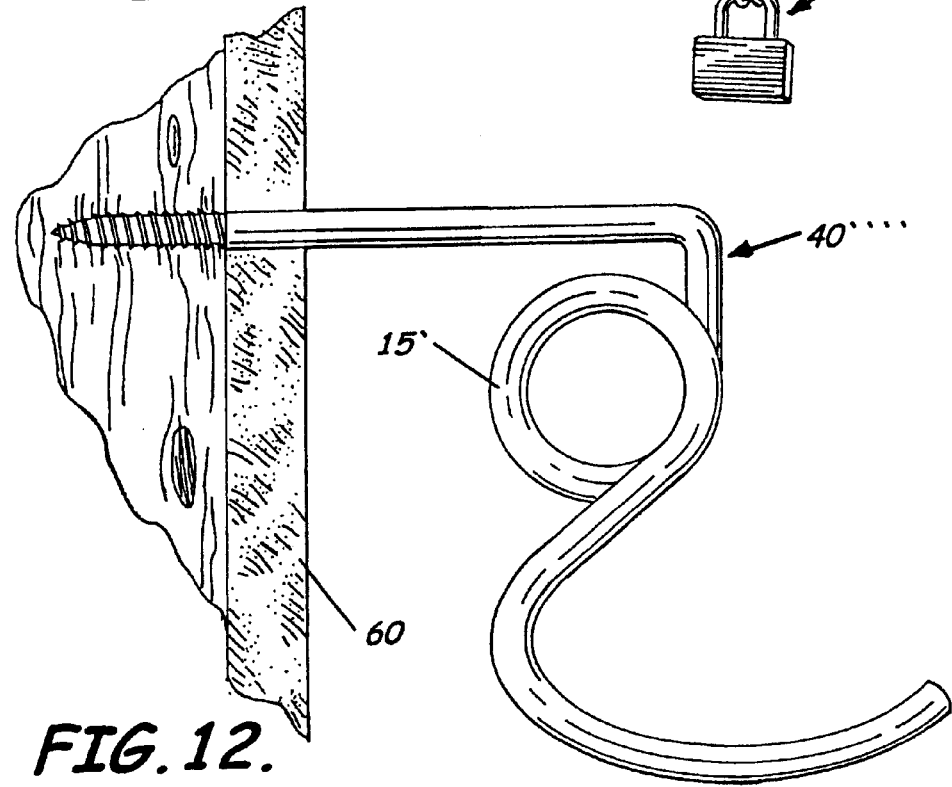
FIG. 12.

APPARATUS AND METHOD FOR PREVENTING THEFT OF A BICYCLE WHILE PROVIDING CONVENIENT STORING OF SAME

FIELD OF THE INVENTION

The present invention relates to the field of storing vehicles and equipment when they are not in use and, more particularly, to securely storing such items in a manner that reduces the risk of theft of same.

BACKGROUND OF THE INVENTION

The bicycle, of course, is not a new invention. Remarkably, though, it retains extraordinary utility and remains an important device around the world despite its mechanical simplicity. Notwithstanding the dominance the automobile has achieved during the last half century as the major mode of transportation on American highways, the bicycle continues to provide transportation, entertainment, and exercise for millions of Americans. In many other countries, the bicycle is the dominant source of affordable transportation, and in a world growing ever more concerned about the detrimental effect the automobile has on the environment, the bicycle along with public transportation is seen as a socially valuable alternative to the automobile. Moreover, the bicycle is a valuable exercise tool for increasingly health conscious American adults, and, of course, for the foreseeable future the bicycle will remain a ubiquitous feature of childhood for millions of America's youth.

Nonetheless, many of the features that make the bicycle such a useful device—lightweight and highly mobile—also ensure that the bicycle is an easy target for theft. According to national crime statistics, every year an estimated 5.6 million bicycles are stolen. (Source: NBC Dateline, Sep. 30, 1997.) Indeed, the resale market for stolen bicycles is a billion dollar-a-year industry, according to these same statistics. The same risk pertains to many useful devices found in the garage of the average American home, including other lightweight vehicles such as mopeds, and yard equipment such as mechanical hedgers, electric clippers, and even lawnmowers. Such devices, like the bicycle, are valuable because they are handy and easy to move, but this is also what makes such devices so vulnerable to a would-be thief going past an open door to a garage where these devices are invariably stored.

Over the years, a number of bicycle storing devices have been proposed in an attempt to provide convenience or anti-theft benefits. Some existing devices attempt to combine such features. For example, U.S. Pat. No. 3,828,936, issued to Hoenig and titled Bicycle Hanger, describes a vertical, wall-mountable device for holding a two-wheeled bicycle in a vertical position with one bicycle tire held on a narrow hook at the top of the device and the second tire resting within a near-floor level ring along with a second ring near the first to hold a lock and chain. U.S. Pat. No. 5,887,461, issued to Heffley and titled Bicycle Locking Device, describes a device mounted to a wall or other surface and having at its base a support arm attached to a locking arm, both of which can pivot upwardly or remain locked in place in a horizontal position. At the end of the locking arm, a "jaw-like" fastener capable of holding a bicycle crossbar is attached.

The Hoenig device requires a plurality of spaced-apart connections holding it to a vertical wall surface if it is to have "vertical stability." In contrast, the base of the Heffley device could be attached, for example, to a ceiling surface. Both devices, however, exhibit the same limitation with respect to bicycle theft deterrence: the portions designed to hold separate locking members are within easy reach for a would-be thief. Heffley suggests placing a padlock through a narrow hole in a lip at the end of the crossbar fastener, but to easily store the bike the fastener must be in easy reach so that one can lift the entire bicycle vertically upward so as to place the crossbar in the vise-like grip positioned at the end of the locking arm. This ensures, though, that the padlock will be just as easy to reach as the locking arm and grip. Accordingly, the lock will be an easy reach for a potential thief as well.

Although the chain-accommodating ring in Hoenig provides a mechanism for securing a bicycle with a heavier, more secure lock as compared to the simple padlocks utilizable in devices like that of Heffley, the position of the ring is nonetheless like the locking lip shown in Heffley, for example, which is easy to reach for would-be thieves. Indeed, a loop, positioned as in Hoenig, is even more theft-amenable in that it is positioned near the bottom of the device near the ring in which a tire rests. A would-be thief crouched in a corner of an open garage would be able to easily attack the lock and chain extending through the ring. Thus, while the ring accommodates a more secure locking device as compared to a Heffley-style padlock, the position of the ring allows a thief to have easy access to the locking device while keeping a low-profile so as to reduce the chance of being seen while undoing the lock.

Other devices similarly fail to provide an apparatus that not only allows one to easily position a bicycle for storing, yet also includes a locking mechanism or place to attach a separate lock that is not within easy reach of a would-be bicycle thief. U.S. Pat. No. 5,702,007, issued to Fritz, et al. and titled Rack Especially Adapted for Use with Bicycles, for example, describes an L-shaped rack that basically provides a wheel well mounted to a wall; one bicycle tire rests on the ground while the other is positioned in the well-founded well and locked in place. A chain or bar lock can be positioned through and within spaced-apart holes in the wall-mounted rack, but it is placed around the wheel which must be restrained lest it slide out of the sloping well that is the interior of the rack.

The disadvantages of such devices are multifold. First one must hold the bicycle in place without its slipping out of the wheel well while the locking member is threaded into place. This can be cumbersome. Secondly, while it is certainly cumbersome to hold a bicycle in place while threading a lock so as to keep it in place, the lock will be left at a level height that would be convenient for a potential thief to access. Placing the lock higher would force a thief to reach up, making disengagement difficult while also making the would-be thief easier to detect, but, placing the lock higher, would make mounting the bicycle in the well and holding it there long enough to thread a lock that much more difficult for the bicycle owner.

U.S. Pat. No. 5,292,009, issued to Smith and titled Bicycle Rack, describes a device that can be attached to almost any surface, provided multiple connection points are utilized to adequately secure the device to the chosen surface. Specifically, Smith describes an elongated channel having a stepped base and right-angled wall member with spaced-apart holes to facilitate fasteners that can be threaded through the spokes of a bicycle to hold a bicycle tire to the channel member. Smith does permit one to place a bicycle out of easy reach of a potential thief. Doing so, however, entails mounting the rack to an upper wall portion or ceiling of a structure and then attaching the bicycle by securing its tires to the device with securing pins. This might be acceptable in cases where a bicycle owner wanted to store the bicycle for an extended period, but it would it be an unduly burdensome task to perform on a daily basis. Thus, whatever advantages would be gained by securing the rack to an upper surface so as to reduce access for a would be thief, would accordingly make it commensurately difficult for the bicycle owner to position the bicycle for storing it. Like the other devices, however, placing the rack in a lower, easier to reach position could be an invitation to a bicycle thief, especially given that a well-known method of stealing a bicycle having a lock around tire is simply to separate the tire and the bicycle frame.

Indeed, while failing to recognize the essential problem of preventing easy access to the locking member, conventional devices in fact provide little in the way of easy mounting of the bicycle to be stored. Both Smith-style mounting and pinning, as well as holding up and locking the bicycle as in Fritz, et al., can be awkward and difficult, as well as time consuming. Both kinds of devices impose cumbersome constraints, in that each type requires one to hold a bicycle in place while fastening a lock or other fastening member to keep the bicycle from slipping out of position. A Heffley-type vise gripper is within easy reach, as noted above, but requires positioning the crossbar of a bicycle within the saddle of the gripper. The gripper cannot be threaded through the spokes of a bicycle to provide other storing positions, such as suspending the stored bicycle on one wheel. Thus, while conventional devices fail to provide maximum theft-deterring features, they do little to enhance the convenience of mounting a bicycle for storing. None adequately provide both convenience in positioning along with a locking mechanism positioned so as to enhance security against theft. As detailed here, there persists a sub-optimal trade-off between ease of storing and reducing the threat of theft of a stored bicycle.

SUMMARY OF THE INVENTION

With the foregoing in mind, the apparatus of the present invention advantageously stores a bicycle while it protects it against theft of the bicycle. The invention, more. specifically, provides both ease in mounting a bicycle for storage while simultaneously providing uniquely positioned and fashioned features that reduce the threat of theft of the stored bicycle. The claimed invention provides other advantages as well, including in terms of size, portability, ease in placement and detachment, and limited manufacturing requirements and costs. Moreover, it will be obvious that the advantages disclosed by the present invention pertain to storage of other types of lightweight vehicles such as a motor bike or conventional equipment like a lawnmower or other device conventionally stored in a home garage.

The present invention provides an elongate bicycle mount that can be suspended from the ceiling or a wall of a structure. The distal end of the elongate mount is arcuate, with the curvature being sufficient to hold in place a bicycle frame or tire while being sufficiently open so as to permit the arcuate distal end to be easily extended through the spokes of a bicycle thereby enabling the easy placement of the tire therein so as to suspend the bicycle. Thus, an advantage of the present invention is that it permits easy positioning of a bicycle for storage in a home garage or beneath an overhang of some structure.

Positioned above the arcuate distal end of the suspended bicycle mount, formed with or connected to the mount, is a substantially closed loop. The loop is capable of receiving and holding a U-shaped lock or a combination of lock and chain. Forming the loop as a unitary piece of the elongate mount has significant manufacturing advantages, but regardless of whether the loop is formed as part of, or otherwise connected to, the elongate member, a significant advantage of the present invention is the unique placement of the loop, especially if it the mount is suspended from the ceiling or an upper portion of a wall. Specifically, the substantially closed loop is positioned at medial portion between the proximal and the arcuate distal ends of the elongate mount. More specifically, the distance between the center of the loop and the farthest axial extent of the elongate mount at the bend in the arcuate distal end is optimally between one quarter and one half the axial length of the elongate mount. The dimensions are purposeful and advantageous with respect to reducing the risk of theft of the bicycle stored upon the elongate mount whenever the mount is suspended to a ceiling or upper portion of a wall. In the present invention, the arcuate distal end can extend down far enough to make it easy to mount a bicycle tire (or, if two mounts are used, a bicycle frame) over the arcuate end so as to store the bicycle suspended upon the mount. Yet at the same time, if the mount is suspended from the ceiling or upper wall portion, with the substantially closed loop positioned sufficiently above the arcuate end, one must reach up to thread a locking device through the loop and around the bicycle mounted upon the elongate mount.

The reach upward for the closed loop, given the relative distances of the arcuate end and closed loop, is not enough to be unduly burdensome to the bicycle owner. Yet the height is sufficient to make it difficult for a would-be thief to attack the lock while standing on the floor of a home garage or surface beneath an overhang where the elongate mount may be suspended. Not only is the would-be thief's manual dexterity reduced in such a position, but so, too, is the opportunity for the thief to attack the lock by kneeling down to avoid detection or appear inconspicuous. Thus, the relative distance between the arcuate end and the closed loop provides an optimal trade-off: a small cost in inconvenience, but a substantial return in theft deterrence.

Further, theft deterrence is achieved by providing a unitary fastener at the upper end of the elongate suspended mount. For example, a thread screw can be formed with or connected to the proximal end of the elongate suspended mount so as to attach it to the ceiling or wall of a structure. Assuming that a lock and chain is positioned through the closed loop of the mount and around the frame of bicycle, the elongate mount fastened with a unitary fastener cannot be unscrewed from the wall or ceiling without rotating the entire bicycle frame as well as the unitarily fastened elongate suspended mount; rotating the mount without simultaneously rotating the bicycle frame works only to wrap a chain tighter around the mount. Alternatively, if a U-shaped lock is positioned through the closed loop, the lock will prevent separate rotation of mount and bicycle altogether. Thus, additional risk deterrence is provided with the present invention by forming at or connecting to the elongate suspended mount a fastener fixedly connected to the elongate suspended mount.

Optimally, the fastener just described will be formed as a unitary part of the elongate suspended mount. Doing so not only serves to ensure that the integrally formed fastener cannot be twisted without twisting the entire elongate suspended mount, but furthermore creates efficiencies in manufacturing. Forming the elongate suspended mount and integrally formed fastener obviates the need for independently producing the mount and the fastener requiring two independent production processes. Further efficiencies likewise can be achieved by unitarily forming as part of the elongate mount the substantially closed loop positioned between the upper end fastener and the arcuate distal end of the mount. Accordingly, the costs of manufacturing the present invention are concomitantly reduced by simplifying the manufacturing process needed to produce the device embodying the present invention.

Not only are manufacturing advantages achieved with the present invention, but additionally the unitarily formed mount and fastener provide for easy placement and detachment by the user of the invention whenever a bicycle frame is not secured to the device. If, for example, the simple unitary thread-screw fastener described above is utilized, the device can be connected to and detached from a structure as easily as turning a screw once a thread screw recess in the structure has been provided. It is thus seen that the present invention lends itself to providing a plurality of separate recesses for receiving the thread-screw fasteners of any number of separate elongate suspended mounts. For example, a separate beam having several thread-screw collars can be attached to the ceiling of a garage or the overhang of a public building. Any number of separate elongate suspended mounts can then be fastened to the beam according to the particular temporal demand for bicycle storing capacity.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 10 is an environmental perspective view of an elongate suspended mount and two elongate suspended mount extenders for extending the axial length of the elongate suspension mount according to the present invention;

FIG. 11 is an environmental perspective view of an elongate suspended mount having an attached locking device formed by separate chains fixedly connected to the closed loop of the elongate suspended mount and including a detachable lock according to the present invention;

FIG. 12 is a side elevational view of an elongate suspension mount suspended from a wall of a structure and having a closed loop extending toward the wall according to the present invention.

DETAILED DESCRIPTION OF PREFERRED EMBODIMENTS

The present invention will now be described more fully hereinafter with reference to the accompanying drawings, which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout; the prime notation, if used, indicates elements in alternate embodiments.

Figures 1, 2:
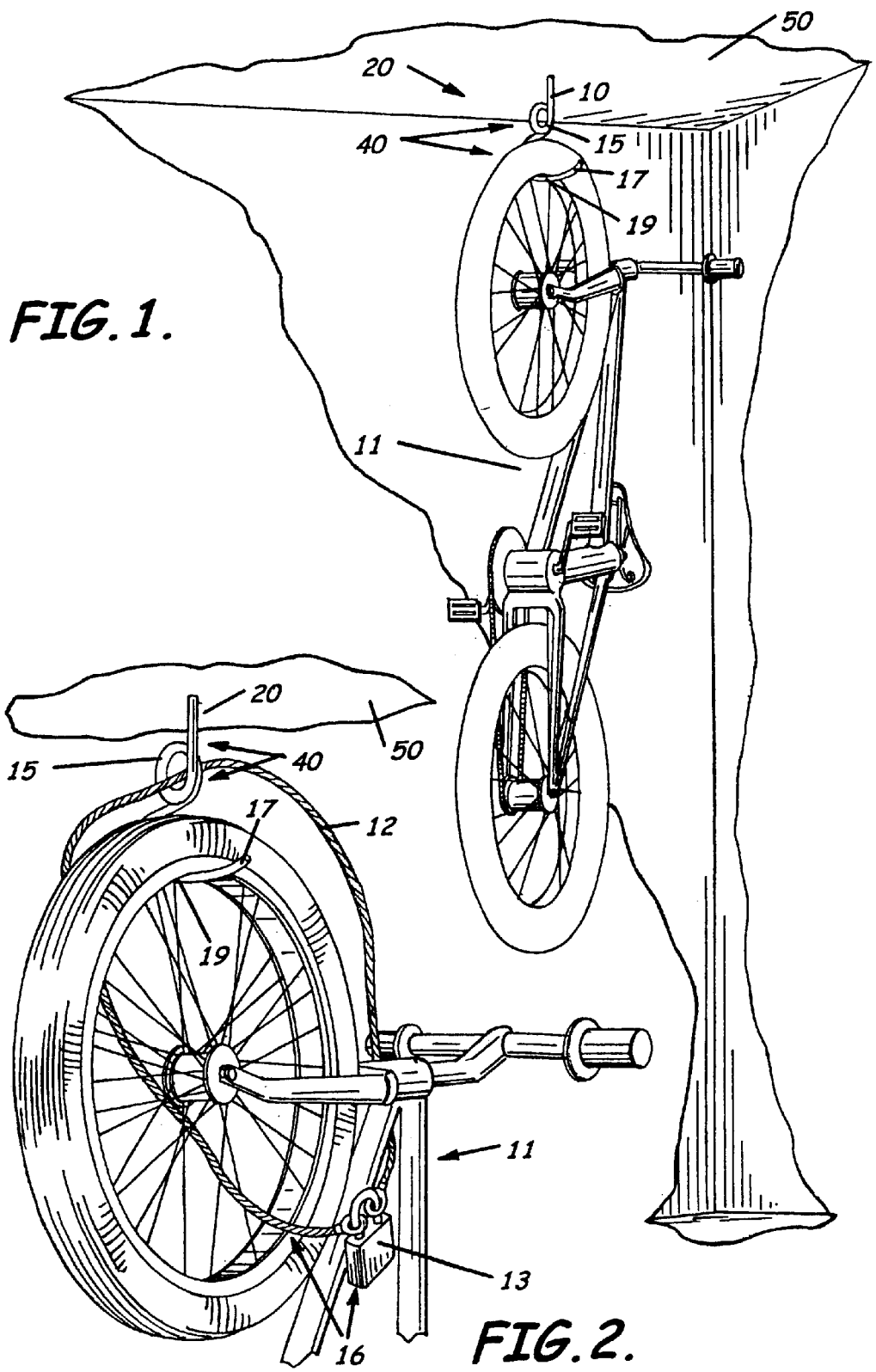
FIG. 1 is a perspective environmental view of a bicycle securely stored upon the arcuate end of an elongate suspended bicycle mount according to the present invention.
FIG. 2 is a perspective environmental view of a suspended bicycle mount secured to an elongate suspended mount by a detachable lock and chain according to the present invention.
Figure 7:
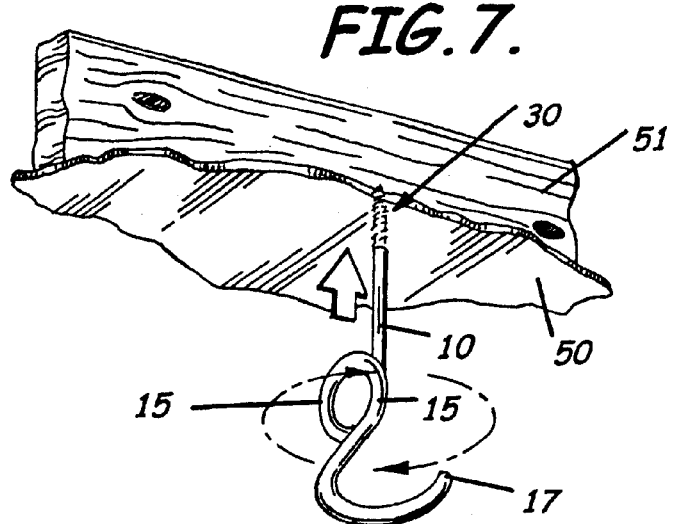
FIG. 7 is a perspective environmental view of a unitary fastener having a screw-type connector for fastening to a screw-threaded recess in a structural beam according to the present invention.

FIG. 1 provides a perspective view of an apparatus 20 for securely storing a bicycle 11 or comparable lightweight device. The apparatus 20 includes a suspended mount 40 upon which a bicycle 11 can be suspended completely or partially above a floor surface (i.e., by having either both tires above the floor surface of a structure to which the mount is attached or having one tire resting on the floor while the other is suspended) or supported in place while both tires contact the ground. As perhaps best shown in FIGS. 5 and 7, a manipulable fastener 30 extends from a proximal end portion 10 of the suspended mount 40 for connecting the mount 40 to the ceiling 50 or a wall of a pre-existing structure. Moreover, the suspended mount 40, as described in detail below, is capable of receiving and holding a detachable locking device 16 (e.g., flexible cable or a chain 12 and a pad lock 13) that can be inserted through a closed loop 15 for securing a bicycle 11 to the suspended mount 40. Thus, the apparatus 20 can further include a detachable locking device 16, or alternatively, a locking device 16' that is fixedly connected to the suspended mount 40'''. For example, two chains 101, 102 may be fixedly connected to the closed loop 15' for locking around a bicycle with a conventional ad lock. (FIG. 11).

Figure 5:
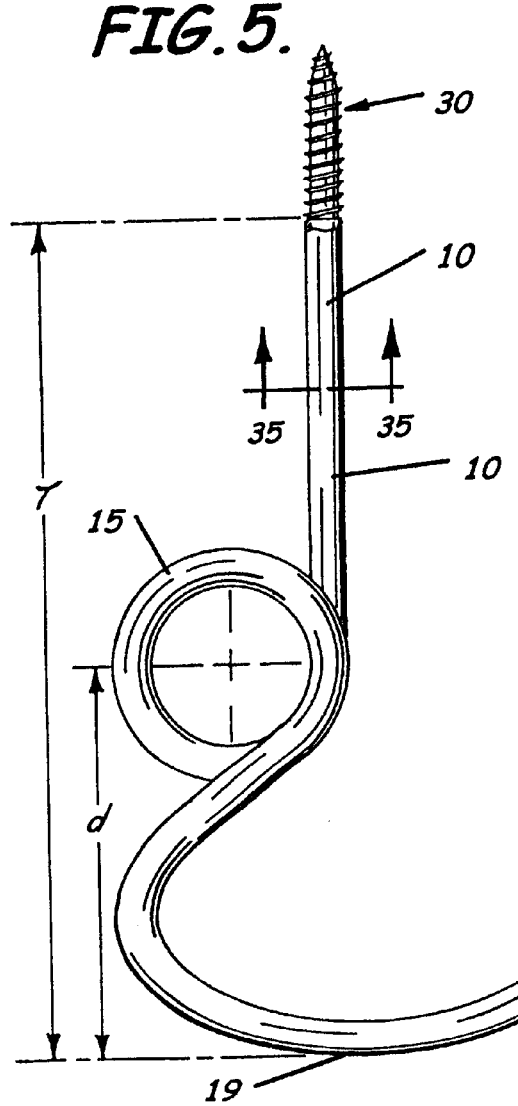
FIG. 5 is a side elevational view showing the optimal relational dimensions of an arcuate distal end and approximately medial-positioned closed loop of an elongate suspended mount having a unitary fastener for connecting to a structural beam according to the present invention.
Figure 6:
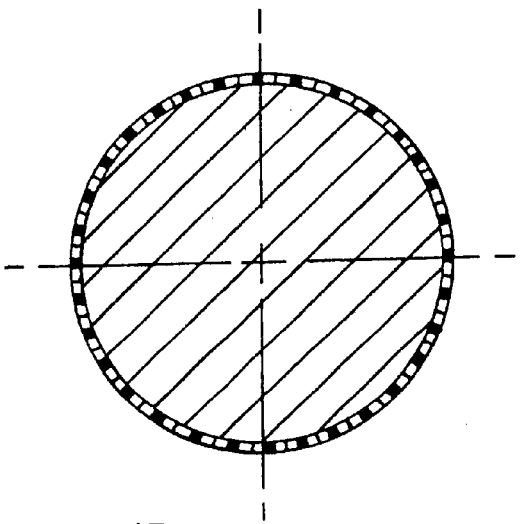
FIG. 6 is a horizontal sectional view taken along line 6—6 of FIG. 5 of the upper or proximal end of an elongate suspended bicycle mount according to the present invention.

As shown perhaps most clearly in FIG. 5, the suspended mount 40 is an elongate member formed, for example, from metal, plastic, or other solid material.

Figure 9:
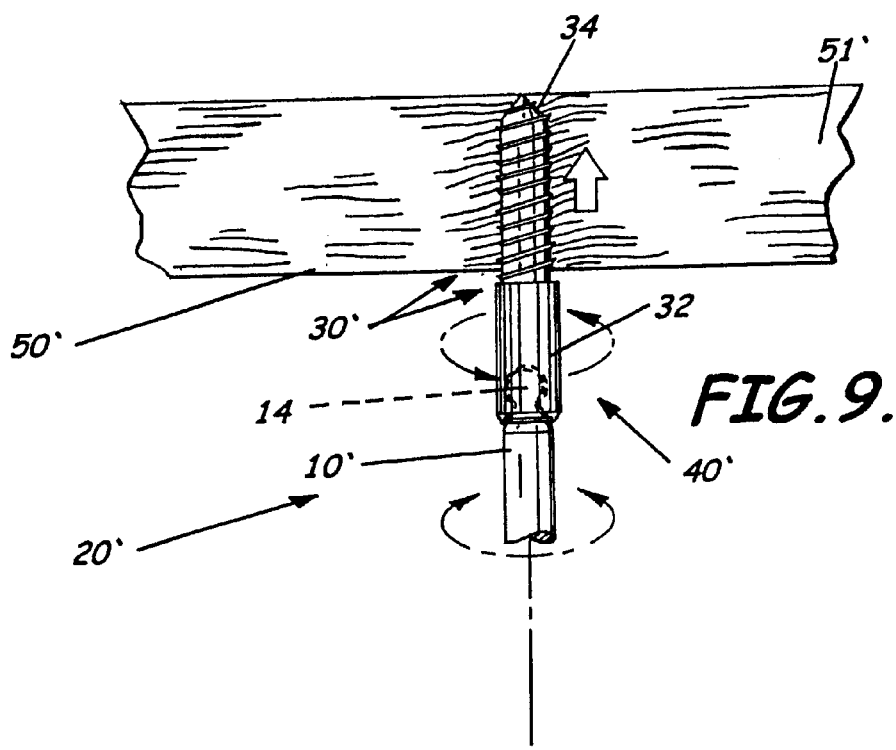
FIG. 9 is a side elevational view showing a rotatably connected fastener having a screw-type connector and gripper-style handle for screwing the fastener into a screw-threaded recess in a structural beam according to the present invention.
Figure 13:
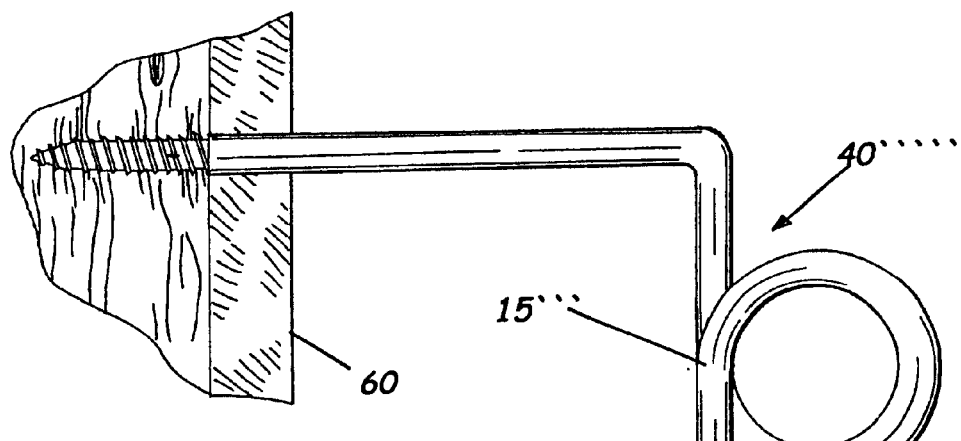
FIG. 13 is a side elevational view of an elongate suspension mount suspended from a wall of a structure and having a closed loop extending away form the wall according to the present invention.
Figure 14:
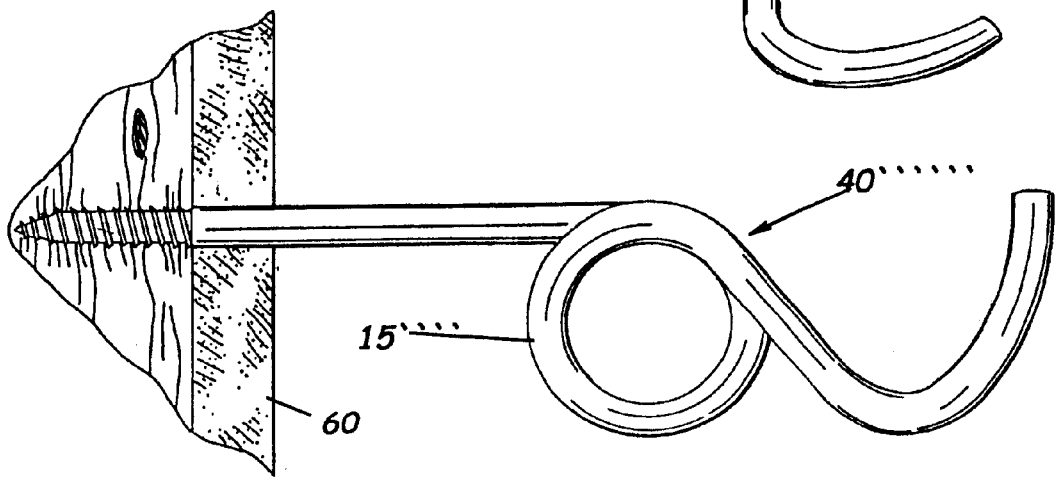
FIG. 14 is a side elevational view of an elongate suspended mount extending from a wall of a structure and having a medially positioned closed loop below the axial length of the elongate according to the present invention.
Figure 15:
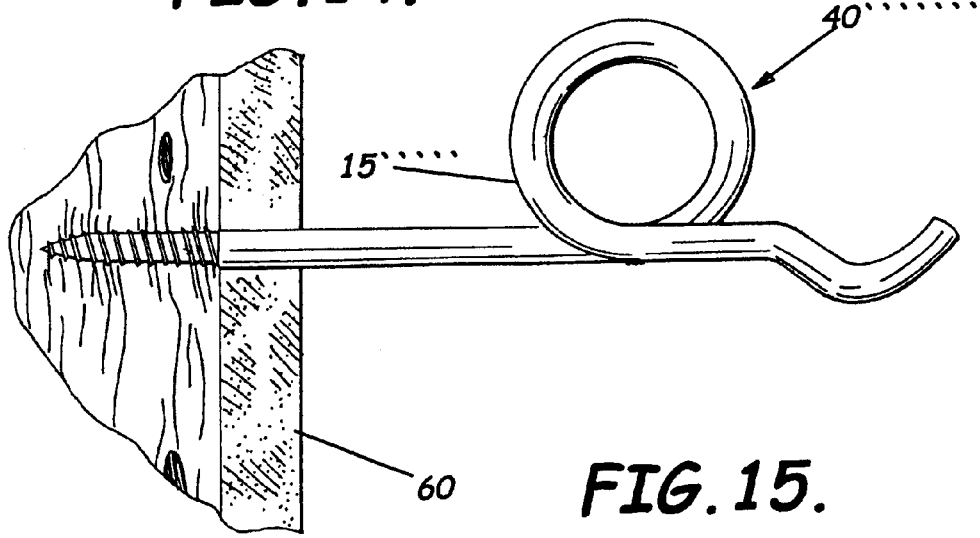
FIG. 15 is a side elevational view of an elongate suspension mount extending from a wall of a structure and having a medially positioned closed loop above the axial length of the elongate suspended mount according to the present invention.

The elongate suspended mount 40 is preferably formed to have a proximal end portion 10 extending from the manipulable fastener 30, a distal end portion 17 formed into an arcuate open loop, and a medial portion formed into or connected to a substantially closed loop 15. As shown in FIG. 9, the manipulable fastener 30' can comprise a distal end portion 32 having a grip handle for easy rotation upon a ball connection member 14 associated with the proximal end portion 10' of the elongate suspended mount 40' and a proximal portion 34 that is helically threaded thereby defining a screw. As discussed further below, however, there are alternative advantages to having the manipulable fastener 30 fixedly connected to the elongate mount 40'(FIGS. 5, 7, and 12–15). More generally, whether the manipulable fastener 30, 30' is fixedly or rotatably connected, as also shown in FIGS. 5, 7, 9, 10, and 12–15, the manipulable fastener 30, 30' can comprise a screw having a cone or gimlet point and spiral threads for insertion into a beam 51, 51' or other portion of a pre-existing structure so as to secure the elongate suspended mount 40 to the ceiling or a wall of the structure. (See, e.g., Mark's Standard Handbook for Mechanical Engineers, 10$^{th}$ ed., Table 8.2.23 at page 10.)

Using the fastener so described, the elongate suspended mount 40, 40', 40'', 40''', 40'''', 40''''', 40'''''', 40''''''' can thereby be suspended from a ceiling 50 or wall 60 (FIGS. 7 and 10–15) of a structure such as the vertical wall or ceiling of a home garage or, alternatively, a wall or an overhang of a structure in a public area. Moreover, as illustrated in FIGS. 12–15, with the mount fastened to a wall, the substantially closed loop 15'', 15''', 15'''', 15''''' can extend toward the wall or away from the wall, as well as lie above or lie below the axial length of the elongate suspended mount.

As FIG. 5 clearly illustrates, a substantially closed loop 15 is positioned on the elongate suspended mount 40 between the proximal end portion 10 and the distal end portion 17 of the elongate suspended mount 40. The substantially closed loop 15 is thus connected to, and, preferably formed as part of, the elongate suspended mount 40. Having the closed loop 15 formed as part of the elongate suspended mount 40 provides easy reach for a bicycle owner, certain theft-deterrence advantages, and generates manufacturing efficiencies as well. As alluded to above, the substantially closed loop 15 preferably can receive a U-shaped bar lock or other locking device 16 (e.g., a cable or a chain 12 and a lock 13) that can be threaded through the substantially closed loop 15. The apparatus thus provides a capability for inserting the locking device 16 through the elongated suspended mount 40 and around the frame of a bicycle 11 thereby allowing one to lock the bicycle frame to the elongated suspended mount 40.

Figure 3:
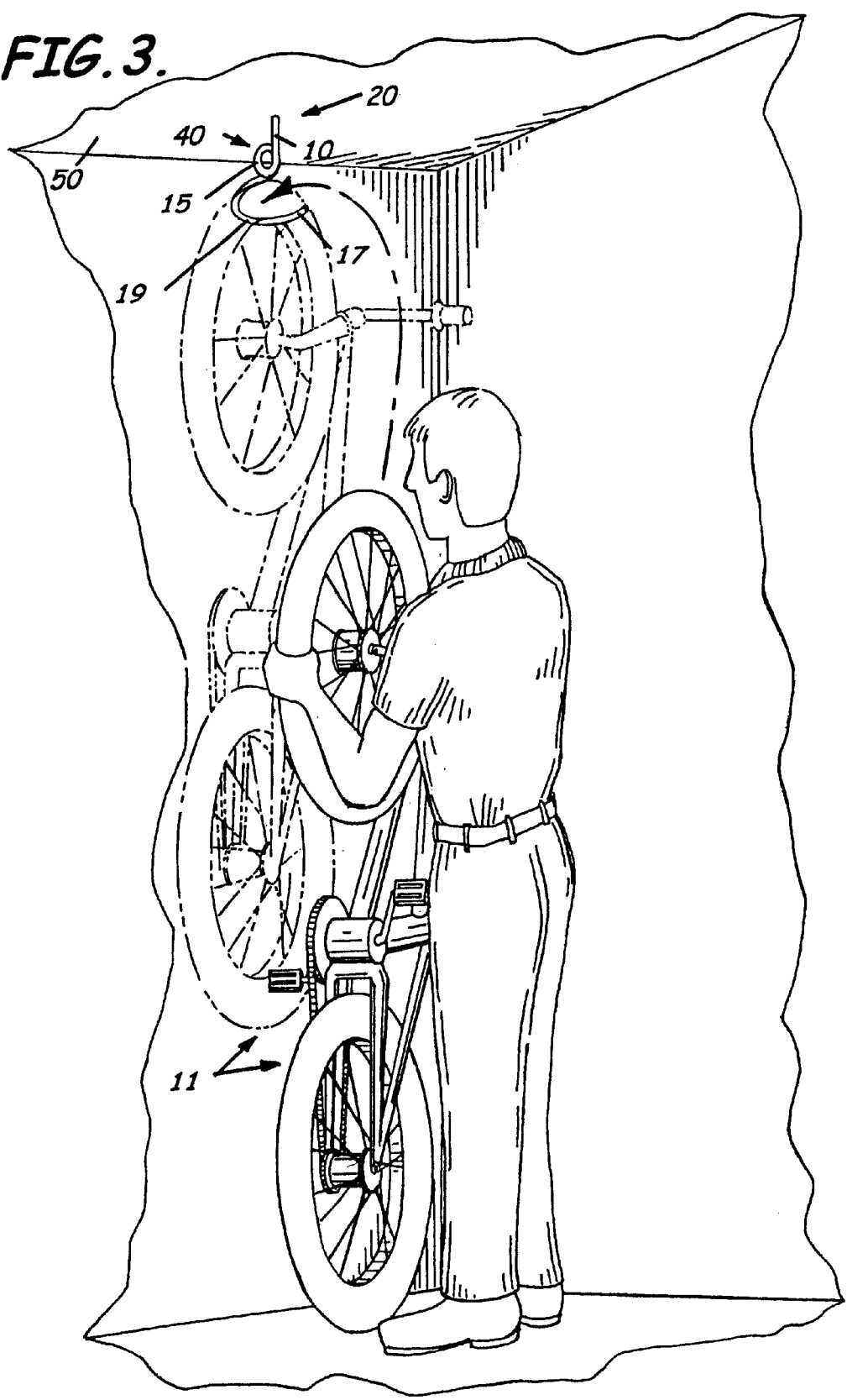
FIG. 3 is a perspective environmental view of a bicycle being mounted upon a suspended bicycle mount by one lifting the bicycle onto a distal arcuate end of the elongate mount such that the arcuate distal end of the mount extends through the spokes of a bicycle tire according to the present invention.
Figure 4:
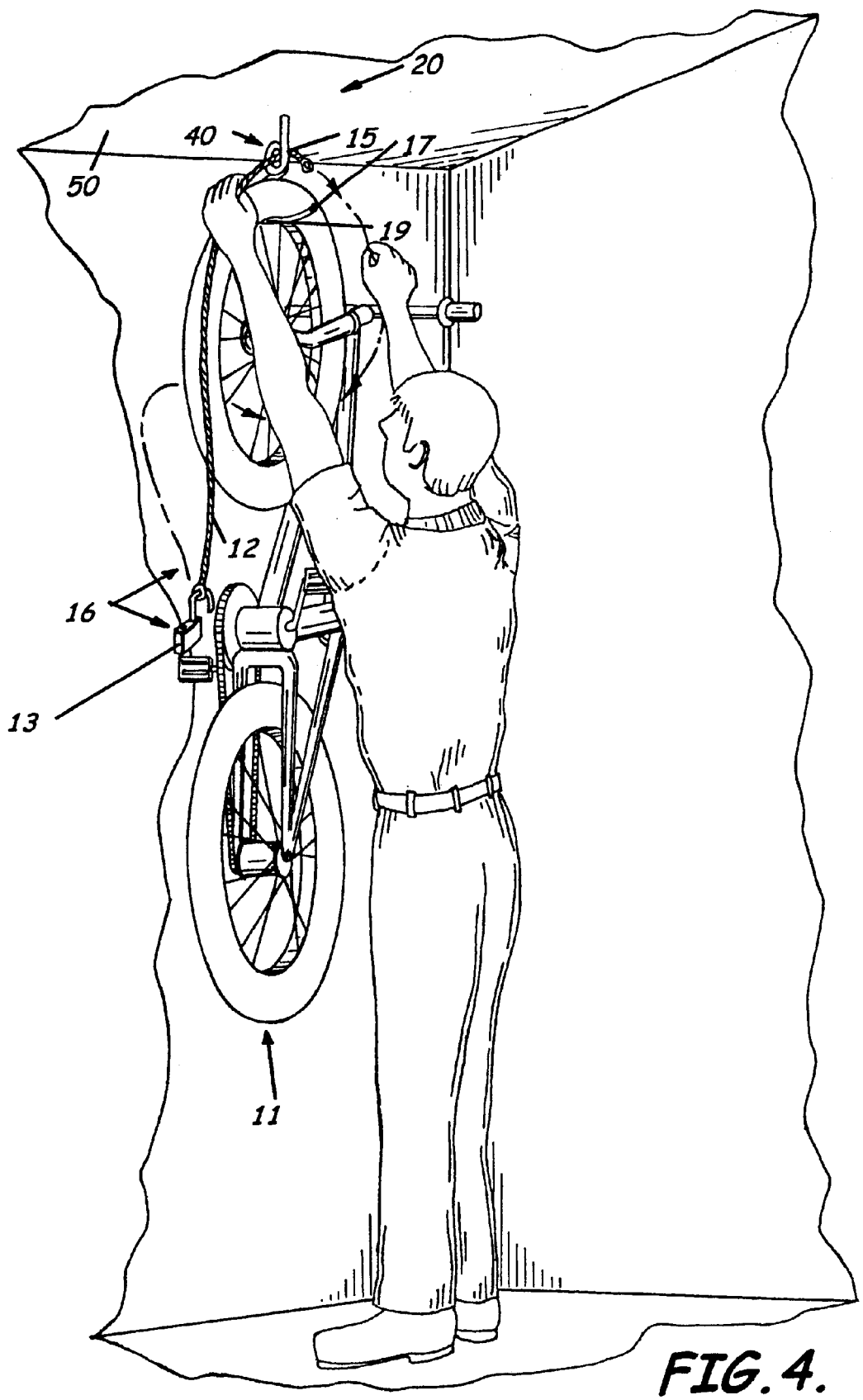
FIG. 4 is a perspective environmental view of a bicycle being secured to an elongate suspended bicycle mount by placing a locking device through the closed loop connected to the mount above an arcuate end of the mount while the bicycle is suspended on the arcuate distal end of the mount according to the present invention.

While the elongate suspended mount can be fastened at any elevation on a wall or other vertical structure, there are decided advantages in terms of theft deterrence in fastening it to a ceiling or upper portion of a wall. The definite advantage lies in the recognition that the ease of storing a bicycle as well as securing it from potential threat is a function of the relative positions of the locking elements used to lock the bicycle in place and the structural points at which the bicycle is mounted for storing. As illustrated in FIGS. 1–4, the arcuate distal end portion 17 of the elongate suspended mount 40 is sufficiently open at a height within easy reach of someone trying to place a bicycle tire over the arcuate distal end portion 17, so as to hold the bicycle 11 suspended therein. As FIG. 4 illustrates, however, the closed loop 15 is positioned at a medial portion of the elongate suspended mount 40 so as to lie above the arcuate distal end portion 17 of the elongate suspended mount 40 making it relatively difficult for a would-be-thief to attack the lock reaching up, while being sufficiently within reach as not to require undue effort on the part of a bicycle owner locking the bicycle for secure storing. the arcuate distal end portion 17, so as to hold the bicycle 11 suspended therein. As FIG. 4 illustrates, however, the closed loop 15 is positioned at a medial portion of the elongate suspended mount 40 so as to lie above the arcuate distal end portion 17 of the elongate suspended mount 40 making it relatively difficult for a would-be bicycle thief to attack the lock reaching up, while being sufficiently within reach as not to require undue effort on the part of a bicycle owner locking the bicycle for secure storing.

FIG. 5 illustrates the relative limits for positioning of these elements in order to achieve an optimal trade-off between the twin objectives of easy storage mounting and effective theft deterrence. In order to facilitate easy mounting of a bicycle 11 on the distal end loop 17 of the elongate suspended mount 40, the closed loop 15 is positioned to lie at a distance d that is substantially one half or less the distance T from the bottom, or apex of the curvature 19, of the arcuate distal end 17 to the top of the proximal end portion 10 where the elongate suspended mount 40 connects with the manipulable fastener 30. Thus, as illustrated in FIGS. 3 and 4, one can easily secure a bicycle 11 using the apparatus 20 by threading the spokes of, say, the front wheel tire of a bicycle 11 over the arcuate distal end 17 of the elongate suspended mount 40 and reach higher to thread a locking device 16 through the closed loop 15. Conversely, so as to force a would-be thief to reach up and make more awkward any attempt to attack the locking device 16, d is preferably nearly (¼)T or more. Thus, the distance d relative to T will lie nearly and substantially within the following boundaries of the following equation for achieving this optimal trade-off between ease of storing and locking versus theft deterrence by:

$$\sim(¼)T \leq d \leq \sim(½)T,$$

where, again, the distance T represents the length of a straight-line distance parallel to the length of the elongated suspension mount 40, while d is the straight-line distance parallel to the length of the elongated suspension mount 40 extending from the center of the loop 15 to the axial apex 19 of the arcuate distal end 17 of the elongated suspension mount 40.

As noted above, the manipulable fastener 30 preferably can be integrally formed with or fixedly connected to the elongate suspension mount 40 so as not to rotate independently of the elongate suspension mount 40 to which it is unitarily connected. This preferable embodiment provides significant theft deterrence whenever, for example, a bicycle 11 is suspended upon the arcuate distal end portion 17 of the elongate suspended mount 40. The advantage of this embodiment arises particularly if the fastener is a thread screw, as described above, which attaches to a pre-formed recess in a pre-existing structure. Assuming that a bicycle 11 is suspended upon the arcuate distal end 17 of the elongate suspended mount 40, and that it is secured with a locking device 16, such as a lock 13 and cable or chain 12 inserted through the substantially closed loop 15 and around the frame of the bicycle 11, such an arrangement ensures that the fastener cannot be disengaged from the structure 50 without unscrewing both the unitary fastener 30 and elongate suspended mount 40. The elongate suspended mount 40 cannot, however, be rotated without simultaneously rotating the chain-secured bicycle 11 suspended thereon; a would-be bicycle thief who attempts to rotate only the elongate suspended mount 40 will succeed only in wrapping the chain 12 more tightly. The same effect is achieved substantially if one utilizes an alternative locking device, such as a U-shaped bar lock that prevents any attempt to rotate the bicycle 11 secured to the elongate suspended mount 40.

Figure 8:
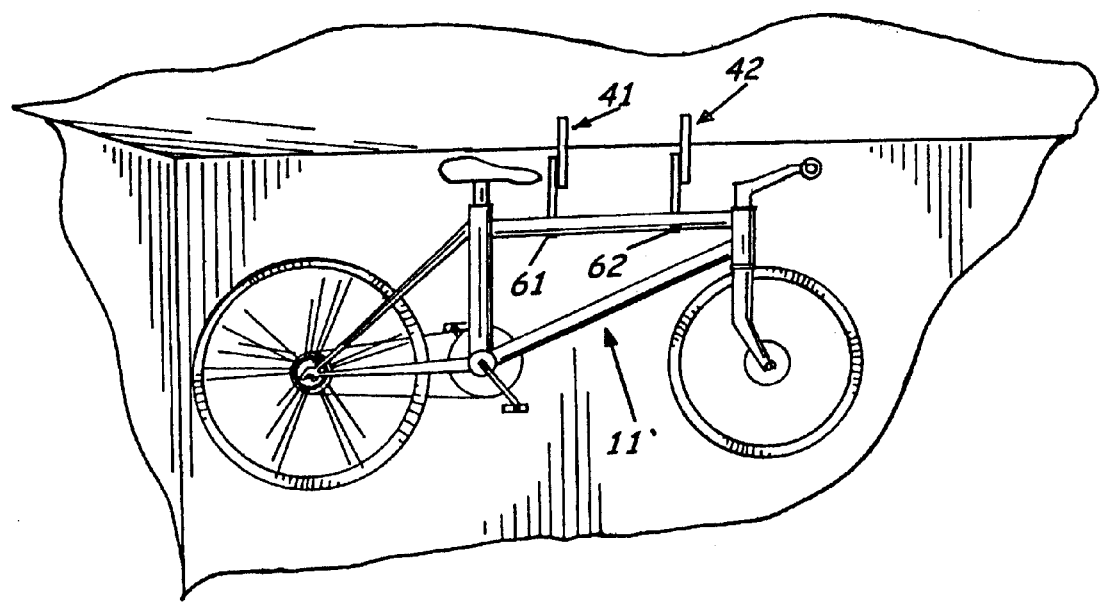
FIG. 8 is a perspective view of dual elongate suspended bicycle mounts secured by a unitary fastener to a structural beam for securely storing a bicycle horizontally according to the present invention.

An alternative embodiment for securely storing a bicycle according to the present invention is illustrated in FIG. 8 and embraces the use of two or more elongate suspended mounts 41, 42 that may be suspended by manipulable fasteners as described above. This arrangement permits one to securely store a plurality of bicycles or, if the elongated suspended mounts 41, 42 are sufficiently spaced apart from one another, to hang a single bicycle 11' or other device from two elongated suspended mounts 41, 42. As shown in FIG. 8, for example, a bicycle 11' can be mounted at two distinct points on the frame of a bicycle 11' on arcuate ends 61, 62 of separate elongated suspended mounts 41, 42. Moreover, if one wishes to use a plurality of elongated suspended mounts 41, 42, an efficient manner for doing so will be to provide a plurality of preformed openings for suspending therein a plurality of elongate suspended mounts 41, 42 up to the number of preformed openings available, with the number varying according to temporal demand for bicycle storage capacity.

Yet another embodiment of the present invention includes separable elongate suspended mount extenders 72, 74, the use of which permits one to extend the length of the proximal end portion of the elongate suspension mount 40". As shown in FIG. 10, each elongate suspended mount extender 72, 74 has.; a distal end 84, 94 comprising a manipulable fastener receiver (e.g., a threaded bore to receive a thread screw member). Extending from the opposing or proximal end of the elongate suspended mount extender 72, 74, is a manipulable fastener 82, 92 of the type already described herein. The distal end 84, 94 of an elongate suspended mount extender 72, 74 is thus capable of connecting to the manipulable fastener 30" of the elongate suspended mount 40" or to the manipulable fastener of another elongate suspended mount. An uppermost elongate suspended mount then can attach to a surface portion 50" of a structure. As illustrated in FIG. 10, a first elongate suspended mount extender 72 receives the manipulable fastener of the elongate suspended mount 40" and in turn connects to a second elongate suspended mount extender 74, which fastens to the surface portion 50' of a pre-existing structure. As will be apparent to the reader, any number of elongate suspended mount extenders can be utilized according to that illustrated.

The method aspects of the present invention likewise are illustrated by FIGS. 1–15 and described herein within the context of securely storing a bicycle. As illustrated, a bicycle is suspended partially or completely from a pre-existing structure using a suspended mount. The bicycle is then secured in its suspended position so as to be engaged by and supported upon the mount. The bicycle is secured in place using a locking device that is positioned in connection with a portion of the bicycle frame and with the mount, so as to securely support the bicycle upon the mount suspended from the structure. The locking device is purposely positioned to connect with the mount at a point relative to the point at which the bicycle is mounted, so as to be positioned nearly a quarter or more, but not much more than a half, of the total distance from the tip of the mount to the top of the mount so as to make it difficult for a would-be thief to attack the locking device. The method can further comprise fastening the mount and mount-supported bicycle to the separate structure using a unitary fastener. Preferably, the fastening step is completed by connecting the mount and mount-supported bicycle using a thread screw positioned within a preformed screw receiver that is connected to the mount such that one cannot disengage the bicycle locked to the mount without rotating both the integrally connected mount and bicycle suspended thereon.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That which is claimed is:

1. An apparatus for securely storing a bicycle, the apparatus comprising:

a substantially elongate suspension mount formed of a single, unitary piece of material, the suspension mount having a proximal end portion, an arcuate and open distal loop end portion extendable through the spokes of a bicycle and curved so as to support a bicycle tire connected to a bicycle frame when suspended thereon, and a medial portion integrally connected to and positioned between the proximal end portion and the distal end portion as a unitary piece of material therewith, the medial portion having a substantially closed loop positioned adjacent the arcuate distal open end portion to retain a locking device when extended therethrough so that the locking device, when extended therethrough, is not readily removable from the substantially closed loop when in a locked position without damage to the locking device;

a threaded fastener integrally connected to the proximal end of the elongate suspension mount as a unitary piece of material; and a detachable locking device extendable through the substantially closed loop of the elongate suspension mount.

2. An apparatus as defined in claim 1 wherein a straight-line distance parallel to the length of the elongate suspension mount and extending from the center of the substantially closed loop to the axial apex of the arcuate distal end of the elongate suspension mount is at least a quarter of the axial distance from the proximal end of the elongate suspension mount to the axial apex of the arcuate distal end of the elongated suspension mount.

3. An apparatus as defined in claim 1 wherein a straight-line distance parallel to the length of the elongate suspension mount and extending from the center of the substantially closed loop to the axial apex of the arcuate distal end of the elongate suspension mount is less than or equal to one half of the distance from the proximal end of the elongate suspension mount to the axial apex of the arcuate distal end of the elongate suspension mount.

4. An apparatus as defined in claim 1 wherein a straight-line distance parallel to the length of the elongate suspension mount and extending from the center of the substantially closed loop to the axial apex of the arcuate distal end of the elongate suspension mount is within an inclusive range of one quarter to one half of the distance from the proximal end of the elongate suspension mount to the axial apex of the arcuate distal end of the elongate suspension mount.

5. An apparatus as defined in claim 4 wherein the distance from the proximal end of the elongate suspension mount to the axial apex of the arcuate distal end of the elongate suspension mount is substantially 10 inches.

6. An apparatus as defined in claim 5 wherein the threaded fastener has a first end integrally formed to the proximal end of the elongate suspension mount, a second end that is tapered to a point, and a medial portion containing helical threads thereby defining a screw for securely connecting the elongate suspension mount to a pre-existing solid structure.

7. An apparatus as defined in claim 6 wherein the axial length of the manipulable fastener is substantially 2 inches.

8. An apparatus as defined in claim 1 wherein the fastening means comprises an integrally formed handle and screw, the handle having a first end rotatably connected to the proximal end of the elongate suspension mount and a second end connected to the screw.

9. An apparatus for securely storing a lightweight wheeled vehicle, the apparatus comprising:
   a substantially elongate suspension mount formed as a single, unitary piece of material, the suspension mount having a spirally threaded proximal end portion, an arcuate and open distal loop end portion, and a medial portion integrally connected to and positioned between the proximal end portion and the distal end portion, the medial portion having a substantially closed loop positioned adjacent the arcuate distal open end portion to retain a locking device when extended therethrough;
   at least one suspension mount extender having a spirally threaded proximal end portion and a distal end portion, wherein the distal end portion contains a threaded bore to secure therein the spirally threaded proximal end portion of the elongate suspension mount; and
   a detachable locking device extendable through the substantially closed loop of the elongate suspension mount.

10. An apparatus as defined in claim 9, wherein the at least one suspension mount extender is a plurality of extenders including at least a first suspension mount extender and a second suspension mount extender, and wherein the first suspension mount extender has a distal end portion threadably connected to the proximal end portion of the elongate suspension mount and a proximal end portion threadably connected to the distal end portion of the second suspension mount extender.

11. An apparatus as defined in claim 9 wherein a straight-line distance parallel to the length of the elongate suspension mount and extending from the center of the substantially closed loop to the axial apex of the arcuate distal end of the elongate suspension mount is at least a quarter of the axial distance from the proximal end of the elongate suspension mount to the axial apex of the arcuate distal end of the elongated suspension mount.

12. An apparatus as defined in claim 9 wherein a straight-line distance parallel to the length of the elongate suspension mount and extending from the center of the substantially closed loop to the axial apex of the arcuate distal end of the elongate suspension mount is less than or equal to one half of the distance from the proximal end of the elongate suspension mount to the axial apex of the arcuate distal end of the elongate suspension mount.

13. An apparatus as defined in claim 9 wherein a straight-line distance parallel to the length of the elongate suspension mount and extending from the center of the substantially closed loop to the axial apex of the arcuate distal end of the elongate suspension mount is within an inclusive range of one quarter to one half of the distance from the proximal end of the elongate suspension mount to the axial apex of the arcuate distal end of the elongate suspension mount.

14. An apparatus for securely storing a bicycle comprising:
   a substantially elongate suspension mount formed as a single, unitary piece of material, the suspension mount having a proximal end portion, an arcuate and open distal loop end portion extendable through the spokes of a bicycle and curved so as to support a bicycle tire connected to a bicycle frame when suspended thereon, and a medial portion integrally connected to and positioned between the proximal end portion and the distal end portion as a unitary piece of material therewith, the medial portion having a substantially closed loop positioned adjacent the arcuate distal open end portion to retain a locking device, when extended therethrough so that the locking device, when extended therethrough, is not readily removable from the substantially closed loop when in a locked position without damage to the locking device; and
   a threaded fastener integrally connected to the proximal end of the elongate suspension mount as a unitary piece of material.

15. An apparatus as defined in claim 14 wherein a straight-line distance parallel to the length of the elongate suspension mount and extending from the center of the substantially closed loop to the axial apex of the arcuate distal end of the elongate suspension mount is at least a quarter of the axial distance from the proximal end of the elongate suspension mount to the axial apex of the arcuate distal end of the elongated suspension mount.

16. An apparatus as defined in claim 14 wherein a straight-line distance parallel to the length of the elongate suspension mount and extending from the center of the substantially closed loop to the axial apex of the arcuate distal end of the elongate suspension mount is less than or equal to one half of the distance from the proximal end of the elongate suspension mount to the axial apex of the arcuate distal end of the elongate suspension mount.

17. An apparatus as defined in claim 14 wherein a straight-line distance parallel to the length of the elongate suspension mount and extending from the center of the substantially closed loop to the axial apex of the arcuate distal end of the elongate suspension mount is within an inclusive range of one quarter to one half of the distance from the proximal end of the elongate suspension mount to the axial apex of the arcuate distal end of the elongate suspension mount.

18. A method for securely storing a bicycle comprising the steps of:
   suspending a bicycle from a substantially elongate suspension mount formed as a single, unitary piece of material connected to a pre-existing structure, the suspension mount having a proximal end portion, an arcuate and open distal loop end portion extendable through the spokes of a bicycle and curved so as to support a bicycle tire connected to a bicycle frame when suspended thereon, a medial portion integrally connected to and positioned between the proximal end portion and the distal end portion as a unitary piece of material therewith, the medial portion having a substantially closed loop positioned adjacent the arcuate distal open end portion to retain a locking device when extended therethrough so that the locking device when extended therethrough is not readily removable from the substantially closed loop when in a locked position without damage to the locking device, and a threaded fastener integrally connected to the proximal end of the elongate suspension mount as a unitary piece of material by holding one bicycle tire attached to a bicycle frame above the surface of a structure;

securing the bicycle in place using a detachable lock a detachable lock positioned through the substantially closed loop of the elongate suspension mount; and supporting the detachable lock in a position above the point at which the bicycle tire is held and below the point at which the suspension mount is connected to the pre-existing structure.

19. A method as defined in claim 18 wherein the step of supporting the detachable lock includes supporting the detachable lock in a position within an inclusive range of one quarter to one half of the distance from the point at which the bicycle tire is supportedly held to the point at which the bicycle is suspended from the suspension mount.

20. An apparatus for securely storing a lightweight wheeled vehicle, the apparatus comprising:

a substantially elongate suspension mount having a spirally threaded proximal end portion, an arcuate and open distal loop end portion, a medial portion connected to and positioned between the proximal end portion and the distal end portion, the medial portion having a substantially closed loop positioned adjacent the arcuate distal open end portion to retain a locking device when extended therethrough;

at least one suspension mount extender having a spirally threaded proximal end portion and a distal end portion, the distal end portion having a threaded bore to secure therein the spirally threaded proximal end portion of the elongate suspension mount, the at least one suspension mount extender being a plurality of extenders including at least a first suspension mount extender and a second suspension mount extender, the first suspension mount extender having a distal end portion threadably connected to the proximal end portion of the elongate suspension mount and a proximal end portion threadably connected to the distal end portion of the second suspension mount extender; and a detachable locking device extendable through the substantially closed loop of the elongate suspension mount.

21. An apparatus for securely storing a bicycle, the apparatus comprising:

a substantially elongate suspension mount having a proximal end portion, an arcuate and open distal loop end portion extendable through the spokes of a bicycle and curved so as to support a bicycle tire connected to a bicycle frame when suspended therefrom, and a medial portion connected to and positioned adjacent the arcuate distal and open end portion to retain a locking device when extended therethrough; and at least one suspension mount extender having a spirally threaded proximal end portion and a distal end portion, the distal end portion having a threaded bore to secure therein the spirally threaded proximal end portion of the elongate suspension mount, the at least one suspension mount extender being a plurality of extenders including at least a first suspension mount extender and a second suspension mount extender, the first suspension mount extender having a distal end portion threadably connected to the proximal end portion of the elongate suspended mount and a proximal end portion threadably connected to the distal end portion of the second suspension mount extender.

* * * * *